March 9, 1965     T. P. GOODMAN     3,172,287
VIBRATION TESTING APPARATUS
Filed June 15, 1961
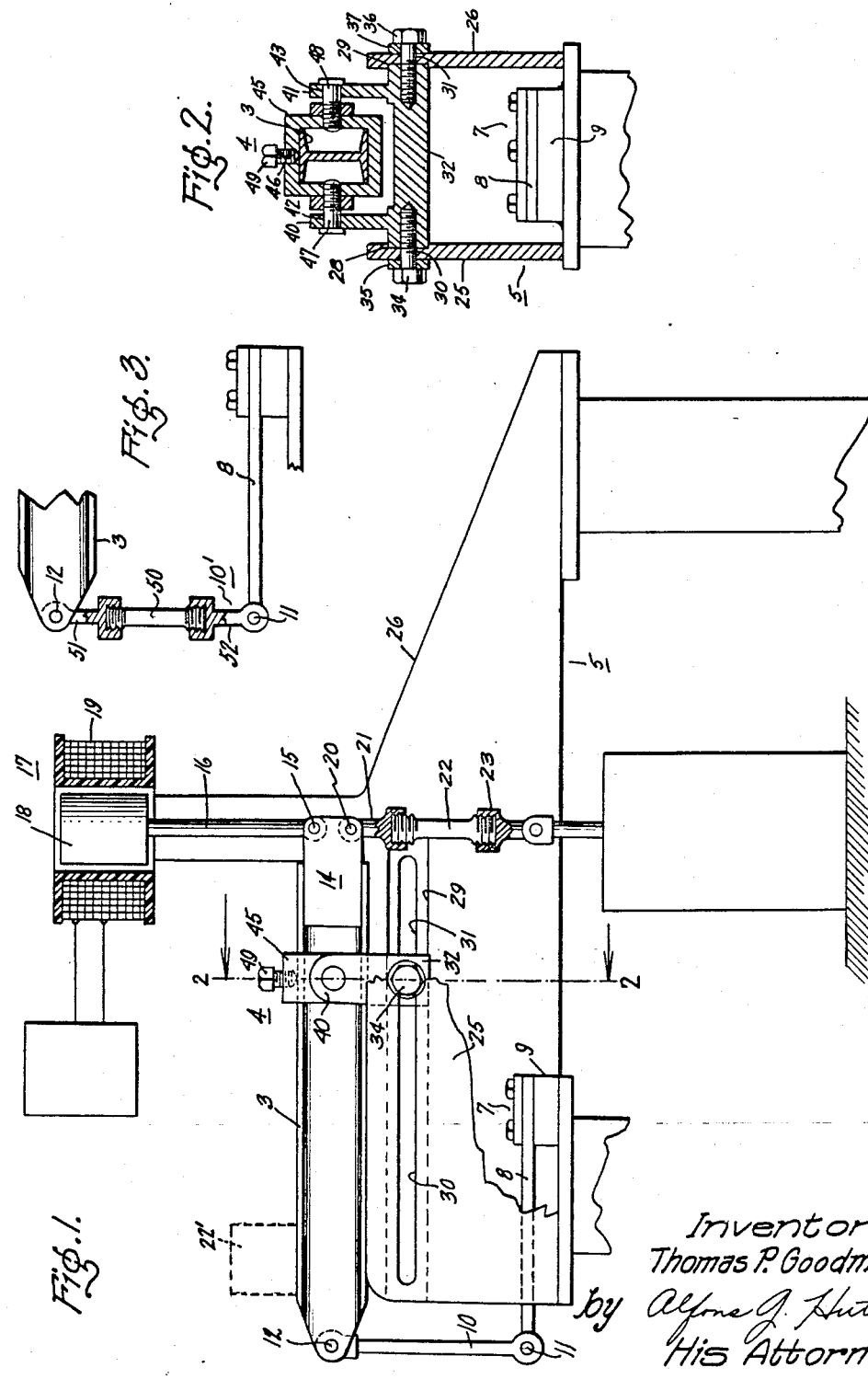
Inventor
Thomas P. Goodman
by Alfons J. Hutter
His Attorney

3,172,287
VIBRATION TESTING APPARATUS
Thomas P. Goodman, Schenectady, N.Y., assignor to General Electric Company, a corporation of New York
Filed June 15, 1961, Ser. No. 117,370
5 Claims. (Cl. 73—67.3)

The present invention relates to vibration testing apparatus and, more particularly, to testing apparatus for vibrating specimens over a wide range of test frequencies.

In vibration testing machines, it may be required that the vibration testing frequency be varied over a wide range. It has been found that the energy supplied to the machine is most effectively utilized when the machine operates at or near resonance. Because of the different characteristics of the test specimen, such as mass, it is often necessary to vary the effective spring gradient of the vibrating structure which constitutes the apparatus to achieve this substantially resonating condition. In apparatus heretofore known, such adjustment has been achieved by changing the spring means utilized in the apparatus. However, it is common testing procedure for the operator to experiment with various springs to determine which spring or arrangement of springs most nearly approaches a resonating system. In other apparatus, attempts have been made to vary the frequency of the vibrating system by manipulating weights in the apparatus to achieve the desired condition.

The chief object of the present invention is to provide an improved vibration testing apparatus.

Another object of the invention is to provide an improved vibration testing apparatus having a variable effective spring gradient.

A still further object of the invention is to provide an improved vibration testing machine wherein resonance in operation may be achieved by varying the effective spring gradient of the machine, specifically by varying the operative association between the test specimen and the resilient mounting means in the apparatus.

These and other objects of my invention may be more readily perceived from the following description.

One of the features of my invention is directed to a vibration testing apparatus wherein a lever is mounted on a movable pivot intermediate the ends of the lever and the ends of the lever are associated with resilient means and a test specimen.

The attached drawing illustrates a preferred embodiment of my invention in which:

FIGURE 1 is a view illustrating an apparatus for practicing the invention;

FIGURE 2 is a view taken through line 2—2 in FIGURE 1; and

FIGURE 3 is a fragmentary view of a modification of the apparatus in FIGURE 1.

In FIGURE 1 there is shown, in elevation, an apparatus for practicing the invention which comprises a beam or lever 3 which is pivotally mounted on support means or pivot member 4. In order to yieldably support lever 3, resilient means may be connected thereto. In this embodiment, the resilient means comprises a cantilever construction 7 which includes a base member 9 from which extends a suitable cantilever spring member 8 connected by means of link 10 to one end of lever 3. Link 10 may be connected to lever 3 by pin connection 12 and to cantilever spring 8 by pin connection 11. From this construction, it can be seen that pivoted lever 3 is resiliently supported by the cantilever construction.

Lever 3 at its opposite end may be provided with a gusset plate 14 having extending therefrom a pair of pivot pins 15 and 20. For the purpose of generating necessary vibrations, suitable means may be supplied connected to pin 15. In this embodiment, pin 15 is connected by link 16 to armature 18 of an electromagnetic shaker 17, armature 18 being operatively associated with an electrically energized field coil 19. The frequency and magnitude of the magnetic field may be controlled by conventional means well known in the art.

From the described construction, it can be seen that lever 3 is pivotally mounted and on one end thereof is connected a cantilever spring construction for resiliently supporting the lever and at the opposite end, means are provided for vibrating the resiliently mounted construction.

As previously noted, gusset plate 14 is provided with pivot pin 20 which is furnished to connect to lever 3 a test specimen or other apparatus to be tested under vibration stresses. In the present embodiment, pivot pin 20 has connected thereto a link 21 having suitable attachment means for a specimen 22 which, in the present embodiment, has its opposite end affixed or anchored at member 23. It will be appreciated that link 21 may be connected to other apparatus or constructions which may be desired to be tested in fatigue or under vibration stresses. If desired, the apparatus to be tested may be connected directly to beam 3 as shown by dotted member 22'.

FIGURE 2 is a view of the apparatus in FIGURE 1 taken through line 2—2. As can be seen in FIGURE 1, the pivot member 4 is supported in suitable slots in base member 5. In FIGURE 2 it can be seen that base member or frame 5 comprises two vertically extending members or uprights 25 and 26, having in the facing walls thereof a pair of horizontally disposed recesses 28 and 29 which constitute tracks. The center portion of tracks 28 and 29 are furnished with slots 30 and 31.

Pivot member 4 (FIGURES 1 and 2) comprises a base member 32 which rides in recesses 28 and 29. Base member 32 is provided with threaded openings for engaging retaining or bolt members 34 and 36 which are associated with washers 35 and 37. This construction permits the base member to be longitudinally positioned in tracks 28 and 29 for movement of the pivot point relative to lever 3. This construction permits variations of the mechanical advantage between the portion of the lever which is resiliently mounted and the portion of the lever which is operatively associated with the shaker construction and the test specimen. It will be appreciated that by moving the pivot member longitudinally, an effective change in the spring gradient is achieved for the system which will permit adjustment of the system to achieve resonance during vibration tests at any desired frequency within a wide range.

Pivot member 4 comprises, as previously mentioned, a base member 32 which also has extending upwardly therefrom a pair of flanges 40 and 41 having bearings 42 and 43 which engage shafts 47 and 48 extending from a receiving member or box member 45. Box member 45 envelops lever 3 which is shown to have a general I beam cross section. In this embodiment, a suitable threaded opening 46 is provided in box member 45 to permit a locking bolt 49 to engage lever 3 to fix the connection between the lever and the pivot construction.

In the operation of the apparatus illustrated in FIGURES 1 and 2, initially specimen 22 is attached to anchor member 23 and to connecting link 21. Movable pivot member 4 may be positioned intermediate the ends of lever 3 by loosening and setting bolts 34, 36, and 49 which permits relative movement of box member 45 of pivot member 4 with respect to lever 3 and also permits lateral movement of base member 32 of pivot member 4. A desired pivot point may be selected and shaker 17 may be energized which causes oscillation of lever 3 about pivot shafts 47 and 48 resulting in a force being transmitted through link 10 to cantilever spring 8 which resiliently supports lever 3 causing vibration thereof. This vibration is also transmitted through link 21 to test specimen 22. By suitably moving the pivot member 4 a condition of resonance may be visually noted, at which time the test of the specimen may be performed and suitable test instruments may be applied to the apparatus and to the specimen.

In FIGURE 3 there is illustrated a modification of the invention disclosed in FIGURES 1 and 2. FIGURE 3 is a fragmentary view of the end of the apparatus shown in FIGURE 1. In this embodiment, instead of a rigid link 10 being utilized to connect beam 3 to spring 8, link 10′ having means for connecting a test specimen 50 is utilized. Link 10′ includes connecting portions 51 and 52 which engage specimen 50 and attach it to pivot pins 11 and 12. During operation with this embodiment, the resilient quality of the specimen is placed in series with cantilever member 8. In the apparatus in FIGURE 1, the specimen and member 8 each have an end connected to ground and are in effect connected in parallel.

The present invention presents an apparatus whose effective spring gradient may be readily varied by shifting a movable pivot point with respect to the ends of the lever. It will be appreciated that the resilient mounting of the spring may be performed with other constructions such as coil springs.

While I have described a preferred embodiment of my invention, it will be understood that my invention is not limited thereto since it may otherwise be embodied within the scope of the appended claims.

What I claim as new and desire to secure by Letters Patent of the United States is:

1. Vibration testing apparatus comprising, in combination,
   (a) a frame,
   (b) support means comprising,
      (aa) a base member slidably mounted on said frame,
      (bb) a pair of flanges extending from said base member, each of said flanges having bearing means therein and,
      (cc) a receiving member pivotally supported by said bearing means between said flanges,
   (c) a lever slidably mounted on said receiving member to provide for relative longitudinal motion therebetween,
   (d) means for oscillating said lever,
   (e) resilient means operatively connecting said lever to said frame and,
   (f) means on said lever adapted to receive a test member.

2. Vibration testing apparatus comprising, in combination,
   a frame including a pair of spaced uprights, each of said uprights having a longitudinal recess provided therein to constitute a track and a longitudinal slot cut therethrough,
   a retaining member receptive in said longitudinal slot,
   support means slidably mounted on said frame, said support means comprising:
      a base member slidably disposed between said uprights and received within said recesses, said base member being retained in a predetermined position by said retaining members,
      a pair of flanges extending from said base member, each of said flanges having bearing means therein and,
      a hollow receiving member pivotally supported by said bearing means between said flanges,
   a lever slidably mounted in said receiving member to provide for relative longitudinal motion therebetween,
   means for oscillating said lever,
   resilient means operatively connecting said lever to said frame and,
   means on said lever adapted to receive a test member.

3. Vibration testing apparatus as defined in claim 1 wherein said means adapted to receive a test member is on one end of said lever and said resilient means is connected to other end thereof.

4. Vibration testing apparatus as defined in claim 1 wherein said means adapted to receive a test member couples said resilient means to said lever.

5. Vibration testing apparatus as defined in claim 1 wherein said resilient means comprises a cantilever spring.

References Cited by the Examiner
UNITED STATES PATENTS

| | | | |
|---|---|---|---|
| 1,608,174 | 11/26 | Heymann | 73—71.5 |
| 2,317,097 | 4/43 | Eksergian | 73—91 |
| 2,496,632 | 2/50 | Lazan | 73—93 X |

FOREIGN PATENTS

| | | |
|---|---|---|
| 962,451 | 12/49 | France. |

RICHARD C. QUIESSER, *Primary Examiner.*

JOHN P. BEAUCHAMP, JOSEPH P. STRIZAK,
*Examiners.*